Oct. 14, 1958    W. H. HOGAN    2,855,791
BALL RETAINER FOR BALL SCREW MECHANISM
Filed Sept. 7, 1954    3 Sheets-Sheet 1

INVENTOR.
WALTER H. HOGAN
BY
ATTORNEY

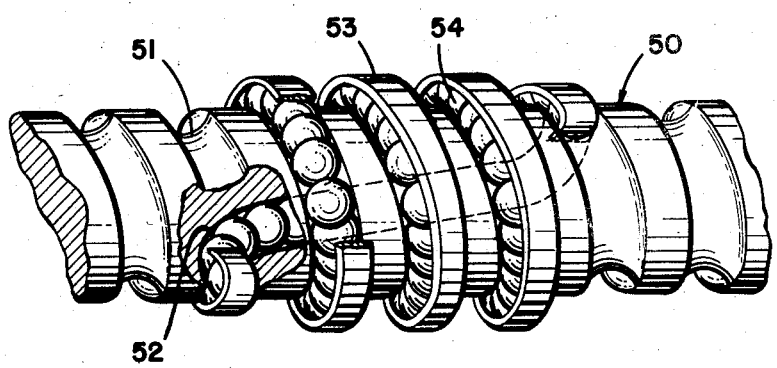
FIG. 12
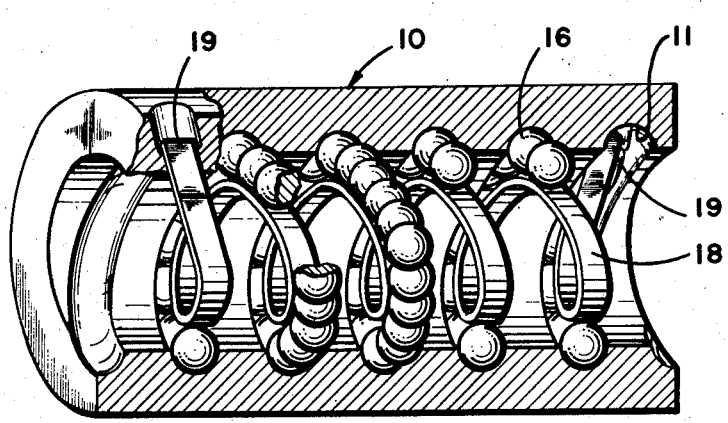
FIG. 7
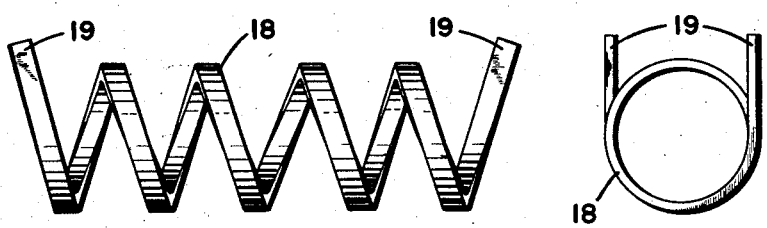
FIG. 5
FIG. 6
INVENTOR.
WALTER H. HOGAN
BY
ATTORNEY Oct. 14, 1958 W. H. HOGAN 2,855,791
BALL RETAINER FOR BALL SCREW MECHANISM
Filed Sept. 7, 1954 3 Sheets-Sheet 3

INVENTOR.
WALTER H. HOGAN
BY
ATTORNEY

United States Patent Office 2,855,791
Patented Oct. 14, 1958

2,855,791

BALL RETAINER FOR BALL SCREW MECHANISM

Walter H. Hogan, Olmsted Falls, Ohio, assignor to Cleveland Pneumatic Industries, Inc., a corporation of Ohio Application September 7, 1954, Serial No. 454,556

10 Claims. (Cl. 74—459)

This invention relates generally to a ball screw device and more particularly to means for retaining the balls within the grooves in the nut or screw.

In the conventional ball screw device complementary grooves are formed in the nut and the screw which cooperate to define a helical ball channel which is filled with balls. These balls interconnect the nut and screw so that as the nut or screw is rotated axial motion results therebetween. Difficulty has been encountered in loading the nut and screw with balls since the screw in such devices is an essential element of the channel and must therefore be in the assembled position during the loading.

Another difficulty in ball screws arises from the fact that the presence of both the nut and screw is necessary to retain the balls in their proper order so disassembly of the nut and screw requires repacking during reassembly. It is therefore apparent that ball screws must normally be sold as assembled units and that interchange or replacement of elements after assembly is impractical.

In a ball screw mechanism according to this invention means are provided in the nut or screw for retaining the balls in the groove without the necessity of the presence of the other element. In such a device loading of the balls is greatly simplified and it is possible to sell or store the screws or nuts in units with the balls loaded therein or to disassemble the screws and nuts without reloading the balls.

It is an important object of this invention to provide a ball screw device where means are provided within the nut or screw to retain the balls within the grooves of the nut or screw.

It is another important object of this invention to provide a ball screw which includes means for retaining the balls within the nut without the necessity of the presence of the screw.

It is still another important object of this invention to provide a ball screw nut which may be removed at will from the screw without the necessity of repacking the balls during reassembly.

It is still another object of this invention to provide a ball screw nut providing means for retaining the balls within the nut grooves which means also deflect the balls from the ball groove into the return tube of the nut.

Further objects and advantages will appear from the following description and drawings, wherein:

Figure 5 is a side view of the preferred ball retaining means;

Figure 6 is an end view of the retaining means shown in Figure 5;

Figure 7 is a perspective view partially in longitudinal section showing a nut with the retaining means according to this invention mounted therein;

Figure 1:
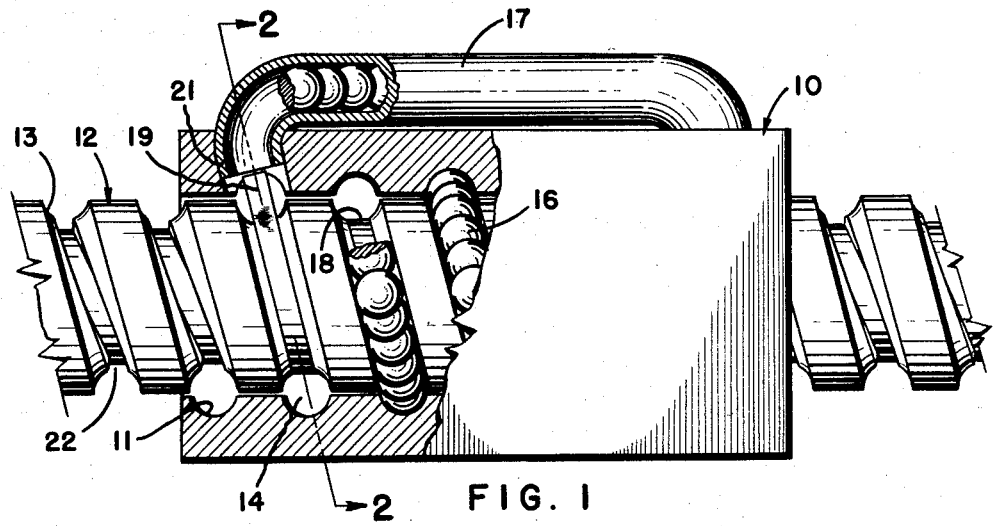
Figure 1 is a side elevation partially in section showing a ball screw incorporating this invention.

In Figure 1 a ball screw device according to this invention is illustrated wherein a nut 10 is formed with a helical internal groove 11 and a screw 12 is formed with a complementary helical groove 13. The grooves 11 and 13 cooperate to define a helical ball channel 14 which is filled with balls 16. In the embodiment shown in Figure 1 a return tube 17 is mounted on the nut with the ends thereof in alignment with the channel 14 so that a closed circuit is provided for the balls 16. This return tube functions in the conventional manner to convey the balls from one end of the nut to the other and will also be filled with balls when the nut is assembled.

A helical retaining member 18 is mounted in the nut 10 and provides means for retaining the balls within the groove 11 even if the screw is not present. This helical retaining member 18 is formed with a lead equal to the lead of the grooves 11 and 13 and provides a surface for engaging the balls.

Figure 2:
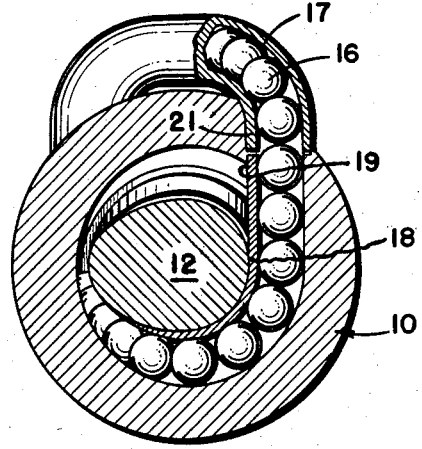
Figure 2 is a cross sectional view taken along 2—2 of Figure 1.
Figure 3:
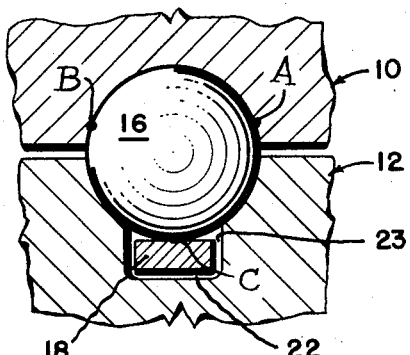
Figure 3 is an enlarged fragmentary section through the screw and nut grooves showing the relative position of the elements and the recess in the screw which accommodates the retaining means.

The surface of the groove 11 in cooperation with the retaining member 18 defines a helical ball channel adapted to receive the balls 16. The walls of the channel are proportioned to provide at least three points, such as the points A, B, and C shown in Figure 3, available for engagement with each of the balls in a plane through the center of the ball perpendicular and crosswise relative to the groove wherein the points are positioned so that a diameter of the ball passing through any one of the points passes between the other two of the points. This structure insures that the balls will be retained within the groove 11 even if the screw 12 is removed from the nut. In this embodiment of the invention the ends 19 of the retaining member 18 are fastened to the nut 10 in such a manner that they are in alignment with a portion of the walls of ends 21 of the return tube 17 so that the balls flow smoothly from the helical channel 14 into the passage of the return tube 17. This is best illustrated in Figure 2.

Those familiar with the art of ball screws are aware of the fact that the loads on the screw or nut are transmitted through the balls by the engagement between the surface of the grooves and the balls so it is essential that the retaining means for holding the balls in the groove 11 be arranged to leave portions of the balls free for engagement with the surface of the groove 13 in the screw. It is also apparent that the retaining member 18 must be provided with clearance relative to the screw so that there will be no engagement between the screw 12 and the retaining member 18. To provide this clearance the groove 13 of the screw 12 is formed with recess 22 at the root of the groove 13. This recess is proportioned to provide clearance 23 between the walls of the recess and the retaining member 18.

Figure 4:
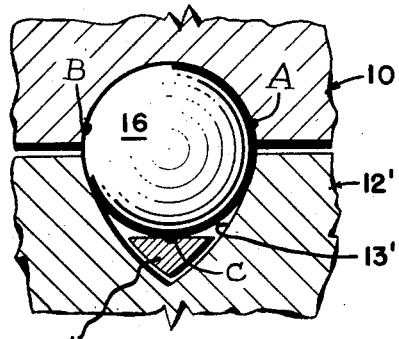
Figure 4 is a fragmentary section showing another form of the retaining means and screw thread.

In the embodiment shown in Figure 4 the retaining member 18' is formed with a substantially triangular cross section and the groove 13' in the screw 12' is formed with a Gothic arch profile so that adequate clearance is provided for the retaining member 18'.

Reference to Figure 7 will illustrate that a ball screw nut according to this invention may be loaded with balls without the screw and that the balls 16 will be properly positioned within the groove 11 by the retaining member 18 even though the screw is not present. It is, therefore, apparent that it is possible to interchange ball loaded nuts and screws at will without reloading the balls after each time the screw is removed from the nut.

Figure 8:
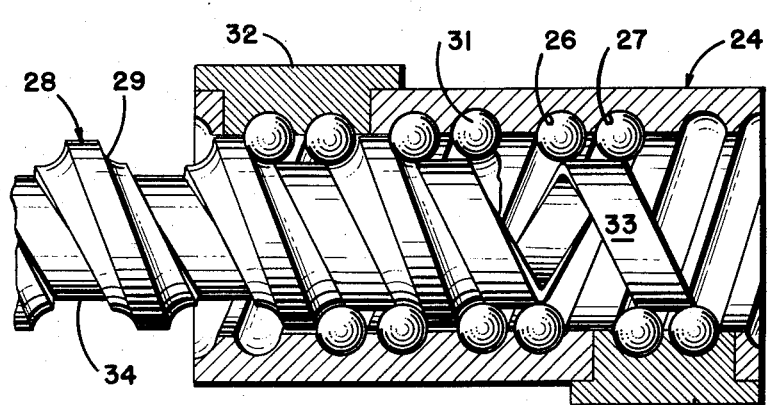
Figure 8 is a side elevation partially longitudinal section showing a retaining means according to this invention applied to a double pass ball screw.
Figures 10, 11:
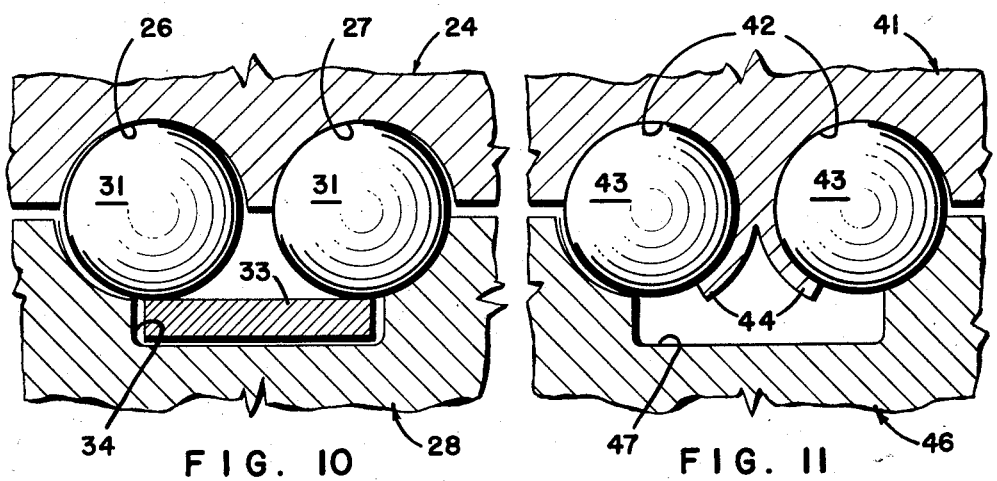
Figure 10 is an enlarged fragmentary section showing the relationship of the elements in the ball screw shown in Figure 8.
Figure 11 is a fragmentary section of another embodiment of this invention showing the relationship of the elements of the nut, screw and retaining means; and, Figure 12 is a perspective view of a modification of this invention with the retaining means mounted on the screw.
Figure 9:
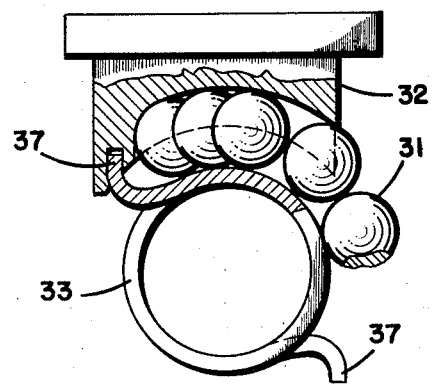
Figure 9 is a fragmentary end view showing the mounting of the retaining means within the ball screw shown in Figure 8.

In Figures 8 through 10 another form of ball screw incorporating this invention is disclosed. This type of ball screw provides two helical passes of balls. For a detailed description of this type of ball screw, reference should be made to the copending application, Serial No. 451,333 filed August 23, 1954. In this embodiment a nut 24 is formed with two coaxial similar helical grooves 26 and 27. A screw 28 is formed with a broad helical groove 29 sufficiently wide to encompass both of the grooves 26 and 27. The grooves 26, 27 and 29 cooperate to define two coaxial helical ball passes which are filled with the balls 31. The nut is also provided with two turn around inserts 32 which connect the ends of the ball passes to provide a closed circuit for the balls. In this embodiment a helical retaining member 33, formed with a lead equal to the lead of the grooves, is mounted in the inserts 32 and is proportioned to engage both of the ball passes as best illustrated in Figure 10. Here again the screw 28 is formed with a recess 34 which provides clearance with the ball retainer 33. The ends 37 of the ball retainer 33 are mounted in the turn around inserts 32 as shown in Figure 9.

The ends of the retaining members may be secured, to the nut in the case of the embodiment shown in Figures 1 through 7 or to the turn around inserts 32 in the embodiment shown in Figures 8 through 10, by any suitable means such as welding, soldering or the like so long as the connection provides rigidity. The retaining members should also be formed of a rigid material since a relatively long free length is present between the ends and the retaining member should not be permitted to touch the screw.

In the embodiment of this invention shown in Figure 11, a nut 41 is formed with grooves 42 adapted to receive balls 43. Adjacent to the grooves 42 the nut is formed with projecting ears 44 which are deflected around the balls 43 after the balls are positioned within the grooves 42. This structure also provides the three points available for engagement with the balls so that the balls are retained within the grooves. Here again a screw 46 is formed with a recess 47 to provide clearance with respect to the ears 44.

Figure 12 shows a modification of this invention wherein the screw 50 is provided with grooves 51 and an internal return passage 52. A helical retaining member 53 mounted on the screw cooperates with the grooves 51 to define a helical ball channel filled with balls 54. The ends of the helical retaining member 53 are mounted adjacent to the return passage 52 and assist in deflecting the balls from the screw groove into the passage as well as providing a structure wherein the balls 54 are retained in the groove of the screw.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a device of the character described, an elongated body member formed with a helical groove extending lengthwise thereof, return means connecting the ends of said groove, antifriction elements adapted to circulate within said groove and return means, and helical means carried by said body member extending lengthwise thereof retaining said antifriction elements within said groove.

2. A ball screw nut assembly including a tubular body formed with a helical groove within its inner wall extending lengthwise thereof, a return passage connecting the ends of said groove, balls adapted to circulate within said groove and passage, a ball retainer within said body having its inner face parallel to the bottom of said groove retaining said balls within said groove, the ends of said retainer being secured to said body adjacent to the ends of said passage.

3. A ball screw nut assembly including a tubular body formed with a helical groove within its inner wall extending lengthwise thereof, a return passage connecting the ends of said groove, balls adapted to circulate within said groove and passage, and helical means within said body and secured thereto retaining said balls within said groove.

4. A ball screw and nut assembly comprising a pair of cooperating helically grooved elongated elements with the grooves thereof defining a helical channel lengthwise of the elements, return means connecting the ends of said channel, balls adapted to circulate within said channel and return means, a ball retainer between said elements having its ends secured to said one element, said retainer being spaced from the groove of said one element engaging said balls and retaining them in the groove of said one element.

5. A ball screw and nut assembly comprising a pair of cooperating helically grooved elongated elements with the grooves thereof defining a helical channel lengthwise of the elements, return means connecting the ends of said channel, balls adapted to circulate within said channel and return means, a ball retainer between said elements having its ends secured to said one element, said retainer being spaced from the groove of said one element engaging said balls and retaining them in the groove of said one element, the groove in the other of said element being formed with a recess adapted to loosely receive said retaining means.

6. A ball screw assembly comprising a body member formed with a helical groove, retaining means rigidly connected to said member, said groove and retaining means cooperating to define a helical ball channel, a plurality of balls in said channel, the walls of said channel being proportioned to provide at least three points available for engagement with each of said balls in a plane through the center of the ball perpendicular and crosswise relative to the groove, said points being positioned so that a diameter of the ball passing through any one of said points passes between the other two of said points.

7. A ball screw comprising a nut formed with a helical internal groove, retaining means rigidly connected to said nut, said groove and retaining means cooperating to define a helical ball channel, a plurality of balls in said channel, the walls of said channel being proportioned to provide at least three points available for engagement with each of said balls in a plane through the center of the ball perpendicular and crosswise relative to the groove, said points being positioned so that a diameter of the ball passing through any one of said points passes between the other two of said points, and a screw formed with a helical peripheral groove having a lead equal to the lead of the groove of said nut, the surface of the groove in said screw engaging the surface of said balls whereby rotational motion between said nut and screw provides axial motion therebetween.

8. A ball screw comprising a nut formed with a helical groove, a plurality of balls positioned in said groove, a retaining member rigidly mounted on said nut adapted to engage a surface of said balls spaced from said groove to retain the balls in said groove, and a screw formed with a helical groove complementary with the groove in said nut, said grooves in said nut and screw providing walls engaging said balls whereby axial motion results between said nut and screw upon relative rotational motion therebetween.

9. A ball screw comprising a nut formed with a helical groove, a plurality of balls positioned in said groove, a return tube for conveying said balls between the ends of said nut, a helical member rigidly mounted on said nut engaging a surface of the balls spaced from said groove retaining the balls in said groove, and a screw formed with a helical groove complementary with the groove in said nut, said grooves in said nut and screw providing walls engaging said balls whereby axial motion results between said balls, nut and screw upon relative rotational motion therebetween, said helical member being formed with a portion substantially adjacent to each end thereof for engaging and deflecting said ball into said tube.

10. The combination of claim 1 wherein said body member is a screw having an external helical groove, and said return means extends internally along said screw.

References Cited in the file of this patent

UNITED STATES PATENTS

| | | |
|---|---|---|
| 1,367,499 | Rapson | Feb. 1, 1921 |
| 2,069,471 | Baker | Feb. 2, 1937 |
| 2,468,506 | Millns | Apr. 26, 1949 |
| 2,636,397 | Jacubenta | Apr. 28, 1953 |
| 2,688,260 | Muller | Sept. 7, 1954 |
| 2,783,656 | Fisher | May 5, 1957 |